United States Patent

Golden et al.

[11] Patent Number: 5,935,631
[45] Date of Patent: *Aug. 10, 1999

[54] REDUCED CALORIE FRIED SNACKS HAVING A COOLING SENSATION WHEN PLACED IN THE MOUTH

[75] Inventors: Rosemary A. Golden, Milltown; Bernard C. Sekula, Glen Gardner, both of N.J.

[73] Assignees: CPC International, Inc., Englewood Cliffs, N.J.; Arco Chemical Technology, Inc., Greenville, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/575,373

[22] Filed: Dec. 20, 1995

[51] Int. Cl.$^6$ ........................................................ A23L 1/00
[52] U.S. Cl. .......................... 426/438; 426/439; 426/440; 426/531; 426/601; 426/603; 426/611; 426/612
[58] Field of Search ...................................... 426/601, 611, 426/531, 311, 603, 606, 612, 656, 658, 438, 439, 440, 804

[56] References Cited

U.S. PATENT DOCUMENTS

| | | | |
|---|---|---|---|
| 3,600,186 | 8/1971 | Mattson et al. | 99/1 |
| 4,789,664 | 12/1988 | Seligson et al. | 514/23 |
| 4,861,613 | 8/1989 | White et al. | 426/611 |
| 5,064,678 | 11/1991 | Klemann et al. | 426/611 |
| 5,273,772 | 12/1993 | Cooper | 426/611 |
| 5,288,884 | 2/1994 | Cooper | 554/168 |
| 5,362,894 | 11/1994 | Handwerker et al. | 554/169 |
| 5,374,446 | 12/1994 | Ferenz et al. | 426/611 |
| 5,376,398 | 12/1994 | Cooper et al. | 426/611 |
| 5,378,486 | 1/1995 | Sullivan | 426/549 |
| 5,399,729 | 3/1995 | Cooper et al. | 554/149 |
| 5,427,815 | 6/1995 | Ferenz | 426/611 |
| 5,512,313 | 4/1996 | Cooper et al. | 426/611 |
| 5,516,544 | 5/1996 | Sekula et al. | 426/611 |

FOREIGN PATENT DOCUMENTS

| | | |
|---|---|---|
| 0236288 | 9/1987 | European Pat. Off. . |
| 0415635 | 3/1991 | European Pat. Off. . |
| 0290420 | 1/1994 | European Pat. Off. . |
| 0651947 | 5/1995 | European Pat. Off. . |
| 9500034 | 1/1995 | WIPO . |

*Primary Examiner*—Leslie Wong
*Attorney, Agent, or Firm*—Norris, McLaughlin & Marcus

[57] ABSTRACT

Reduced calorie fried snacks are prepared by replacing some or all of the oil conventionally used in frying with a fat replacement composition containing a fatty acid-esterified propoxylated glycerin composition which exhibits a sharp melt before about 92° F. Potato chips, corn chips and similar fried snacks prepared according to the invention exhibit a unique cooling sensation when placed in the mouth.

17 Claims, No Drawings

5,935,631

REDUCED CALORIE FRIED SNACKS HAVING A COOLING SENSATION WHEN PLACED IN THE MOUTH

BACKGROUND OF THE INVENTION

1. Field of the Invention

The present invention has to do with reduced calorie snacks prepared by frying in a reduced calorie fat replacement composition. More specifically, the invention relates to fried snacks wherein some or all of the oil conventionally used in frying has been replaced by a fatty acid-esterified propoxylated glycerin composition. The snacks exhibit a unique cooling sensation when placed in the mouth.

2. Description of the Related Art

Fried snacks, such as potato and corn chips, are typically fried in liquid or partially hydrogenated vegetable oils. These include soybean, canola, cottonseed, corn, sunflower, peanut, safflower and partially hydrogenated soybean, canola, cottonseed, corn and sunflower oils. The oils impart a pleasant fried flavor to snack products as well as an oily/greasy texture. Solid fats are not used in the preparation of fried snacks because the high level of absorbed oil in the fried product, generally from about 25% to about 45% by weight, would result in a waxy mouthfeel upon consumption.

Fat replacement compositions which have been developed for use in low calorie fat-containing foods are known. An early development employing sugar fatty acid ester compositions is described in U.S. Pat. No. 3,600,186, and the compositions are said to be suitable for use in frying eggs, meat, fish, potatoes and the like.

The use of sucrose polyesters as fat replacement compositions is disclosed in U.S. Pat. No. 4,789,664 in foods described as having blood cholesterol lowering properties but they are not suggested as a substitute for the oils normally used in frying.

In European Patent Application 0 236 288, low calorie fat materials are described which include sugar fatty acid polyesters, polyglycerol fatty acid esters and tricarboxylic acids esterified with fatty alcohols. The materials are said to be useful in a wide variety of food products, including fried farinaceous snack foods such as potato chips, corn chips and the like. Polyol polyesters and their use in shortenings and foods also are described in European Patent Specification 0 290 420. The polyesters are said to be useful to make foods which are fried in oil including fried farinaceous and/or salted snack foods.

All of the low calorie fat replacement compositions discussed above have drawbacks either in the processes of their use or the flavor and mouthfeel characteristics of the reduced fat products which employ them.

Reduced calorie food compositions containing fat-type organoleptic ingredients are known wherein an esterified epoxide-extended polyol is employed as a full or partial replacement for vegetable oils and fats. Fat substitutes of this type are disclosed in U. S. Pat. No. 4,861,613 to White et al. (referred to herein as "White" and incorporated by reference herein in its entirety). However, it has not heretofore been known that such substances can be used to make fried snack foods having a perceptible cooling sensation.

U.S. Pat. No. 5,378,486 describes a shortbread which is said to have a perceptible cooling sensation. The shortbread contains confectioners' sugar and fats bearing long, saturated $C_{16}$ to $C_{22}$ fatty acid residues and a mixture of short $C_2$ to C , acid residues, a portion of which are propionic acid residues. A preferred embodiment contains residues of fatty acids derived from fully hydrogenated oils containing at least about 75% stearic acid.

It has now been found that certain fatty acid-esterified propoxylated glycerin compositions can be employed as a substitute for some or all of the fat used to prepare fried snack foods such as potato chips and corn chips to make fried snacks having a perceptible cooling sensation when placed in the mouth.

In the present specification and claims, all parts and percentages are by weight unless otherwise specified.

SUMMARY OF THE INVENTION

Low-calorie fried snacks prepared by frying in certain fatty acid-esterified propoxylated glycerin compositions, as a replacement for liquid or partially hydrogenated vegetable oils, exhibit a cooling sensation when placed in the mouth. Suitable fatty acid-esterified propoxylated glycerin compositions are those which exhibit a sharp melt before about 92° F., preferably over a temperature range from about 70° F. to about 92° F. Accordingly, fatty acid-esterified propoxylated glycerin compositions having solid-fat indices meeting the following specifications will exhibit this cooling effect:

SFI>about 50 at 80° F.;

SFI<about 30 at 92° F.; more preferably<about 25; most preferably<about 15; and

SFI<about 5 at 98.6° F.

The solid fat index (sometimes abbreviated herein as "SFI") referred to throughout the present specification is determined by dilatometry in accordance with AOCS Official Method Cd 10-57 (available from American Oil Chemists' Society, 1608 Broadmoor Dr., Champaign, Ill. 61821-5930 USA).

The fatty acid-esterified propoxylated glycerin compositions (sometimes referred to herein as "EPG" in the singular form and as "EPGs" in the plural form) are made by incorporating propylene oxide (sometimes referred to herein as "oxypropylene" or "PO") groups into a typical triglyceride fat as described in White. The fat replacement compositions can contain one fatty acid or a blend of fatty acids.

The average number of PO groups which are incorporated into a fatty acid is called the propoxylation number. The melting point, melting profile and other characteristics of the composition can be modified by adjusting the propoxylation number, the fatty acid chain length and level of unsaturation. Similarly, two or more different EPGs (i.e., having different propoxylation numbers) of the same fatty acid, two or more EPGs of different fatty acids having the same or different propoxylation numbers, and any combination thereof which provides the desired fat replacement characteristics may be utilized.

In the present invention, a preferred embodiment of the reduced-calorie fried snacks employs as a substitute for the oils conventionally used to prepare fried snacks a fully hydrogenated soybean fatty acid-esterified propoxylated glycerin composition having a propoxylation number of 5 (referred to herein as "FHEPG-05 soyate").

DETAILED DESCRIPTION OF THE INVENTION

In order for the fatty acid-esterified propoxylated glycerin compositions of this invention to function effectively as substitutes for the liquid or partially hydrogenated vegetable oils conventionally used in frying snack foods, the solid fat index of the EPG should exhibit a sharp melt before about 92° F. Thus, mixtures of two or more different EPGs (i.e., having different propoxylation numbers) of the same fatty acid can be used, mixtures of two or more EPGs of different fatty acids having the same or different propoxylation numbers can be used, and any combination thereof can be used as long as the desired melting profile characteristics are obtained.

The fatty acid-esterified propoxylated glycerin compositions of this invention contain glyceryl residues, oxypropylene units, and fatty acid acyl

groups. Typically, the compositions are mixtures of individual fatty acid-esterified propoxylated glycerin compounds which may differ from each other in degree of propoxylation and acyl group composition. The glyceryl residue may have the generic structure

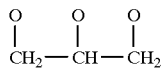

and is derived from glycerin

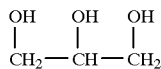

or a glycerin equivalent. The oxypropylene units are generally interspersed between glyceryl residues and the acyl groups and have the structure

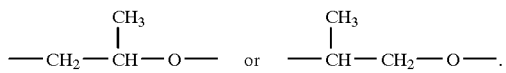

Typically, more than one oxypropylene unit may be present between an oxygen of an individual glyceryl residue and an acyl group such that a polyoxypropylene unit is created. However, a single "branch" or "arm" of the fatty acid-esterified propoxylated glycerin may contain only one oxypropylene unit. Certain of the acyl groups may be attached directly to the glyceryl residue, without any intervening oxypropylene units, although an average of at least 3 oxypropylene units per glyceryl residue must be present in the overall composition. The average number of oxypropylene units in the fatty acid-esterified propoxylated glycerin composition is from 3 to 10. The presence of oxypropylene units is critical, as the oxypropylene units help to lower the melting point of the compositions thereby improving the melting characteristics as compared to analogous compositions not containing oxypropylene units.

In order to maximize the resistance of the fatty acid-esterified propoxylated glycerin composition towards pancreatic lipase enzyme-catalyzed hydrolysis, the oxypropylene units adjacent to the acyl groups should be oriented such that secondary rather than primary ester linkages are created. That is, the methyl group should be located on the carbon atom attached to the oxygen atom forming part of the ester linkage as follows:

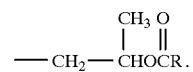

Preferably, at least 80% of the ester linkages in the overall composition are secondary. Most preferably, at least 95% of the ester linkages are secondary. However, the secondary ester content can be less than 80% without adversely affecting the fat replacement properties of the EPGs of the invention.

It is desirable for the fatty acid-esterified propoxylated glycerin composition to be substantially esterified such that it has an average of at least about 2.5 (more preferably, at least about 2.9) fatty acid acyl groups per equivalent of glycerin. The extent of esterification may be readily determined by conventional analytical methods such as hydroxyl number.

The structure of the composition preferably is such that the composition has a porcine pancreatic lipase hydrolysis rate of less than about 10% as compared to an olive oil standard. Preferably, the relative hydrolysis rate is less than about 1% of the olive oil rate. Methods of measuring porcine pancreatic lipase hydrolysis rate are described in White.

The average number of oxypropylene units in the EPG must not be so low as to result in a high proportion of the acyl groups being attached directly to glyceryl residues since such directly attached acyl groups will be nearly as susceptible to enzymatic cleavage as the acyl groups in a conventional fully digestible triglyceride, thus reducing the usefulness of the composition as a low calorie fat substitute. At the same time the average number of oxypropylene units should not exceed about 10 since the resulting compounds may be substantially lower in melting point or higher in melt viscosity than is needed to meet the requirements of the invention.

The solid fat index for a given EPG may be adjusted as needed by varying the average number of oxypropylene units per glycerin (propoxylation number) present in the composition. At a constant fatty acid acyl group content (i.e., if the relative proportions of the different acyl groups present are fixed), the solid fat index at a particular temperature will increase as the propoxylation number is decreased and will decrease as the propoxylation number is increased. As the average number of fatty acid acyl group carbons per equivalent of glycerin decreases or as the iodine number of the composition increases (as a result of increasing the proportion of unsaturated fatty acid acyl groups present), the average number of oxypropylene units per glycerin will need to be decreased to maintain the solid fat index at a given temperature above a predetermined target value. If a particular fatty acid-esterified propoxylated glycerin composition has an undesirably high solid fat index at a given temperature the index may be brought below a predetermined target value by increasing the propoxylation number. By so adjusting the average number of oxypropylene units per equivalent of glycerin, the melting properties of each EPG may be controlled to obtain a fat replacement composition having a solid fat index which meets the requirements of the invention.

Suitable EPGs may be prepared using either fatty acids or fatty acid derivatives such as fatty acid esters, fatty acid halides, or fatty acid anhydrides. Generally speaking, $C_{12}$–$C_{24}$ saturated linear fatty acids and their derivatives can be used as starting materials for preparing the EPGs of the invention.

In addition, the iodine number (which reflects the proportion of unsaturated fatty acid acyl groups in the composition) must be less than about 30, more preferably is less than about 20, and most preferably is less than about 10 centigrams $I_2$ per gram of the composition. A relatively minor proportion of unsaturated fatty acid acyl groups may be present provided that the amount is sufficiently small to maintain the desirably narrow melting range required to achieve the cooling sensation of the invention. Iodine number (also referred to as iodine value) may be measured by AOCS Official Method Cd 1-25.

The $C_{12}$–$C_{24}$ saturated fatty acid is linear (i.e., nonbranched) and preferably contains only one carboxylic acid functionality. The acyl group may thus correspond to the general structure

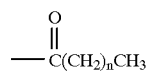

wherein n is an integer of from 10 to 22. The value of n is most conveniently an even number (e.g., 10, 12, 14, 16, 18, 20, or 22) since the corresponding fatty acids are readily available at low cost from natural sources such as edible triglycerides. Specific illustrative fatty acids suitable for use as this component of the fatty acid-esterified propoxylated glycerin compositions include, but are not limited to lauric acid, myristic acid, stearic acid, palmitic acid, eicosanoic (arachidic) acid, heneicosanoic acid, docosanic (behenic) acid, tricosanoic acid, and tetracosanoic (lignoceric) acid. Mixtures of these $C_{12}$–$C_{24}$ saturated linear fatty acids may also be utilized to advantage, as discussed above.

While all of the acyl groups in the fatty acid-esterified propoxylated glycerin composition may be derived from $C_{12}$–$C_{24}$ saturated linear fatty acid, the compositions may contain minor amounts of acyl groups derived from other $C_8$–$C_{24}$ fatty acids. Preferably, the proportion of such other acyl groups is less than 40%. Generally speaking, the incorporation of acyl groups which are relatively short in length ($C_8$–$C_{18}$), unsaturated, and/or branched will tend to decrease the melting point of the resulting EPG.

The fatty acids which optionally may be used in combination with the required $C_{12}$–$C_{24}$ saturated linear fatty acids may be any of the known fatty acids such as caprylic acid, pelargonic acid, capric acid, oleic acid, cetoleic acid, palmitoleic acid, gadoleic acid, erucic acid, rincinoleic acid, linoleic acid, linolenic acid, myristoleic acid, eleostearic acid, arachidonic acid, or mixtures of these acids. Preferably, linear monocarboxylic acids containing from 0 to 5 double bonds are employed.

The proportions and chemical structures of the fatty acid acyl groups in the fat replacement compositions of this invention should be selected such that the solid fat indices as determined by dilatometry will meet the following specifications SFI>about 50 at 80° F.;

SFI<about 30 at 92° F.; more preferably<about 25; most preferably<about 15; and

SFI<about 5 at 98.6° F.

Increasing the ratio of average number of fatty acid acyl group carbons per equivalent of glycerin will shift the melting range of an EPG to a higher average temperature while decreasing the ratio will shift the melting range to a lower average temperature. The melting profile of the fat replacement composition can thus be conveniently made to meet the requirements of the invention by adjusting this ratio.

The average number of fatty acid acyl group carbons per equivalent of glycerin in the fatty acid-esterified propoxylated glycerin compositions of the invention may be readily calculated from a knowledge of the fatty acid acyl group content (i.e., the chemical structures and relative proportions of the fatty acids used to prepare the compositions). The following formula may be used to calculate this average number ($N_a$) for a fatty acid-esterified propoxylated glycerin composition prepared using fatty acids A and B:

$$N_a = \frac{\text{moles } A \times \text{no. carbons in } A}{\text{moles propoxylated glycerin}} + \frac{\text{moles } B \times \text{no. carbons in } B}{\text{moles propoxylated glycerin}}$$

For example, a composition prepared by reacting a mixture of 1.5 moles of stearic acid (a $C_{18}$ fatty acid) and 1.5 moles of eicosanoic acid (a $C_{20}$ fatty acid) with 1 mole of propoxylated glycerin containing an average of 7 oxypropylene units per glycerin will have an average of 57 fatty acid acyl carbons per equivalent of glycerin.

To minimize the available caloric content of the fatty acid-esterified propoxylated glycerin fat replacement compositions of this invention, the chemical composition should be selected such that the average molecular weight is at least about 800. More preferably, the minimum molecular weight is about 1000. In order for the fatty acid-esterified propoxylated glycerin composition to exhibit the sharp melting profile and hence the cooling mouth feel, it is also desirable that the average molecular weight not exceed about 2200. Preferably, the molecular weight is below about 2000.

In a preferred embodiment of the invention, a stearic (i.e. $C_{18}$) acid-esterified propoxylated glycerin composition is employed having an average number of oxypropylene units per equivalent of glycerin (propoxylation number) of about 5, an iodine number less than about 10, an average number of fatty acid acyl group carbons per equivalent of glycerin of from about 51 to about 57, and a solid fat index>about 50 at 80° F. and<about 0.1 at 92° F. Fatty acids which are predominantly stearic, having at least about 75% and preferably at least about 80% by weight of saturated $C_{18}$ fatty acid, are most preferred. For example, hydrogenated soybean fatty acid is predominantly stearic, generally from about 83% to about 93% by weight, and it has been found to be particularly suitable for preparing the fried snack foods of the invention. Other fatty acid sources having more than about 75% stearic acid after hydrogenation include corn oil, cottonseed oil, olive oil, peanut oil, canola (low erucic rapeseed) oil, safflower oil, sesame oil, sunflower oil and mixtures thereof.

The fatty acid-esterified propoxylated glycerin fat replacement compositions of this invention may be prepared using any suitable method. In general, the procedures described in the prior art for synthesizing other fatty acid-esterified propoxylated glycerin compositions will be appropriate for use provided that the necessary $C_{12}$–$C_{24}$ saturated linear fatty acids or fatty acid derivatives are employed in the esterification step. Such procedures are described, for example, in U.S. Pat. Nos. 4,861,613 (the White patent, referenced above) and 4,983,329 and in European Patent Publication No. 353,928, the disclosures of which are incorporated by reference herein in their entirety. As is explained in more detail in the above-mentioned publications, either fatty acids or fatty acid equivalents such as fatty acid esters, fatty acid halides, or fatty acid anhydrides may actually be employed in the esterification. The $C_{12}$–$C_{24}$ saturated linear fatty acid acyl groups may also be introduced by using $C_{12}$–$C_{24}$ unsaturated fatty acids in the esterification step and then hydrogenating the esterified propoxylated glycerin composition to increase the proportion of $C_{12}$–$C_{24}$ saturated linear fatty acid acyl groups to the desired level. Any residual free fatty acid remaining in the composition after esterification should preferably be removed or reduced as much as possible to minimize problems with off flavor, off-odor, or storage stability.

The fatty acid-esterified propoxylated glycerin compositions of the present invention are particularly suitable for use as replacements for liquid or partially hydrogenated vegetable oils of the type conventionally used in preparing fried snacks. Typically, fried snacks are comprised of about 25 to about 45 weight percent of a fat component. To achieve a significant reduction in available caloric content and obtain the unique cooling sensation, it will generally be desirable for at least about 30 weight percent and preferably at least about 40 weight percent of the fat component to be a suitable fatty acid-esterified propoxylated glycerin composition. The balance of the fat component may be a liquid or partially hydrogenated vegetable oil or a different fat substitute, equivalent or mimetic which is capable of being used in frying. The amount of the fat replacement composition may, if desired, constitute up to 100% of the total fat component in the product.

In addition to the fat component comprised of the fatty acid-esterified propoxylated glycerin composition, the fried snack of the invention may further comprise one or more other conventional snack food ingredients such as sugars (e.g., sucrose, fructose, glucose and maltose), water, flavorings such as jalapeno, cheese, sour cream, or nut flavorings, seasonings such as salt or pepper, milk solids (non-fat, skimmed, or whole), emulsifiers such as lecithin, antioxidants, dietary fibers, vitamins, bulking or bodying agents such as polydextrose or modified starch and the like. A sugar alcohol such as sorbitol, xylitol, or mannitol or a reduced calorie sweetener such as saccharine, aspartame, cyclamates, sucralose, acesulfame, acesulfam-K, or the like may also be employed in combination with the fatty acid-esterified propoxylated glycerin compositions of the invention.

Food products in accordance with the invention may be readily prepared by replacing the oil component of a standard frying oil formulation with the fatty acid-esterified propoxylated glycerin fat replacement compositions described hereinabove using known processing methods and techniques as will be apparent to those skilled in the art.

Soybean fatty acids have been found to be particularly suitable and, as illustrated in Table I, FHEPG-05 soyate has been found to follow the requisite solid fat index.

EXAMPLES

Example 1

To illustrate the effect of the average number of oxypropylene units per equivalent of glycerin on the melting characteristics of fatty acid-esterified propoxylated glycerin compositions, the following series of such compositions were synthesized using the procedures described in U.S. Pat. No. 4,983,329. The average number of oxypropylene units per equivalent of glycerin was varied from 3 to 8 and various types and ratios of fatty acid were employed. In each case, the reaction was carried out until essentially all of the hydroxyl groups of the propoxylated glycerin had been esterified. The finished products were variously characterized using analytical methods commonly used by the industry to evaluate oils and fats. These methods included Wijs iodine value (AOCS Cd 1-25), dropping point (AOCS Cc 18-80 (93)) and solid fat index (AOCS Cd 10-57). The solid fat index of each composition at certain temperatures is shown in Table I.

TABLE I

| COMPOSITION | SFI DATA AT ° F. | | | | | |
|---|---|---|---|---|---|---|
| | 50 | 70 | 80 | 92 | 98.6 | 104 |
| EPG-03 ST | 82.3 | 81.4 | 80.2 | 74.1 | ND | 0.1 |
| EPG-05 HS | 71.9 | 64.8 | 53.9 | <0.1 | <0.1 | <0.1 |
| EPG-05 ST | 75 | 72 | 67.5 | 0.1 | ND | <0.1 |
| EPG-05 HR/ST (7/3) | O/S | 64.7 | 58.2 | 28.1 | 1.1 | <0.1 |
| EPG-05 HR/LS (7/3) | 50.4 | 29.9 | 18.4 | 5.5 | 0.4 | 0.2 |
| EPG-05 HR/LS (9/1) | 74.4 | 65.8 | 59.8 | 43.0 | ND | 2.8 |
| EPG-08 B/ST (1/1) | 74.2 | 68.3 | 60.6 | 28.2 | ND | <0.1 |
| EPG-08 HR | 70.0 | 66 | 60.9 | 25.1 | ND | <0.1 |
| EPG-08 HR/ST (45/55) | 73.7 | 67.8 | 62.7 | 24.8 | <0.1 | <0.1 |
| EPG-08 B/ST (1/3) | 69.4 | 61.6 | 38.2 | <0.1 | ND | <0.1 |

KEY
HS = Fully hydrogenated soybean oil fatty acids
HR = Fully hydrogenated rapeseed oil fatty acids
ST = Contains 95% stearic (C18:0) and 5% palmitic (C16:0) acids
B = Contains 85% behenic (C22:0) and 15% stearic acids
LS = Liquid soybean oil fatty acids
Fatty acid blend ratios are shown in parentheses.
O/S means off scale.

The compositions EPG-03 ST, EPG-05 HR/LS (7/3), EPG-05 HR/LS (9/1) and EPG-08 B/ST (1/3) were found to be unsuitable for use according to the invention either because the SFI at 80° F. was too low (EPG-05 HR/LS (7/3) and EPG-08 B/ST (1/3)) or the SFI at 92° F. was too high (EPG-03 ST and EPG-05 HR/LS (9/1)) and as a consequence they were not characterized by the sharp melt required according to the present invention.

In contrast, the melting behavior of the remaining compositions were suitable. In each case, the melting range was desirably sharp (i.e. the compositions change from mostly solid to mostly liquid over a temperature range of 80–92° F. and were essentially completely liquid at 98.6° F.).

Example 2

Potato chips were fried in a 5 quart Dazy deep fryer charged with 2000 grams of oil. One hundred and fifty grams of sliced potatoes were fried per batch for approximately 2–3 minutes or until bubbling in the fryer was negligible. This process yielded a chip with approximately 2–3% moisture and 35–40% fat.

Upon cooling and storage, the potato chips fried in fully hydrogenated EPG-05 soyate (EPG-05 HS from Table 1) exhibited a "cooling" sensation when placed in the mouth.

The "cooling" sensation was not evident with chips fried in EPG-05 HR/LS 9:1 because EPG-05 HR/LS 9:1 does not exhibit a sharp melt much before 92° F. Similarly, other compounds, that do not meet the aforementioned specifications and would also not be expected to demonstrate this "cooling" effect, are identified above.

Accordingly, it is believed that any EPG compounds meeting the following specifications will exhibit this "cooling" effect:

SFI>50 at 80° F.

SFI<30 at 92° F.; more preferably<25; most preferably<15

SFI<5 at 98.6° F.

What is claimed is:

1. A reduced calorie fried snack product having a fat component comprising at least about 30% by weight of a fatty acid-esterified propoxylated glycerin composition having a solid fact index at about 80° F. of greater than about 50, at about 92° F. of less than about 30 and at about 98.6° F. of less than about 5 which provides the organoleptic sensation of cooling when said fried snack product is placed into the mouth for consumption.

2. The product of claim 1, wherein the solid fat index at about 92° F. is less than about 25.

3. The product of claim 1, wherein the solid fat index at about 92° F. is less than about 15.

4. The product of claim 1 comprising a potato chip or corn chip.

5. The product of claim 1 wherein the fatty acid-esterified propoxylated glycerin composition has an average number of oxypropylene units of from 3 to 10.

6. The product of claim 5 wherein the fatty acid-esterified propoxylated glycerin composition has esterified linkages and at least about 80% of the linkages are secondary.

7. The product of claim 5 having an average of at least 2.5 fatty acid acyl groups per equivalent of glycerin.

8. The product of claim 5 wherein the number average molecular weight is at least about 800 and does not exceed about 2200.

9. A method of making reduced calorie fried snack product comprising frying a farinaceous material in a fatty acid-esterified propoxylated glycerin composition having a solid fat index at about 80° F. of greater than about 50, at about 92° F. of less than about 30 and at about 98.6° F. of less than about 5 which provides the organoleptic sensation of cooling when said fried snack product is placed into the mouth for consumption.

10. The method of claim 9, wherein the solid fat index at about 92° F. is less than about 25.

11. The method of claim 9, wherein the solid fat index at about 92° F. is less than about 15.

12. The method of claim 9 wherein the farinaceous material is selected from potato or corn.

13. The method of claim 9 wherein the fatty acid-esterified propoxylated glycerin composition has an average number of oxypropylene units of from 3 to 10.

14. The method of claim 13 wherein the fatty acid-esterified propoxylated glycerin composition has esterified linkages and at least about 80% of the linkages are secondary.

15. The method of claim 14 having an average of at least 2.5 fatty acid acyl groups per equivalent of glycerin.

16. The method of claim 14 wherein the number average molecular weight is at least about 800 and does not exceed about 2200.

17. A frying oil composition for use in preparing reduced calorie fried snack products comprising at least about 30% by weight of fatty acid-esterified propoxylated glycerin composition having a solid fat index at about 80° F. of greater than about 50, at about 92° F. of less than about 30 and at about 98.6° F. of less than about 5 which provides the organoleptic sensation of cooling when said fried snack product is placed into the mouth for consumption.

* * * * *